W. A. WARNER.
NUT LOCK.
APPLICATION FILED OCT. 17, 1917.

1,286,457.

Patented Dec. 3, 1918.

WITNESSES
Gordon Ladshaw

INVENTOR
William A. Warner
By Richard Owen,
ATTORNEY

UNITED STATES PATENT OFFICE.

WILLIAM A. WARNER, OF SPOKANE, WASHINGTON.

NUT-LOCK.

1,286,457.  Specification of Letters Patent.  Patented Dec. 3, 1918.

Application filed October 17, 1917. Serial No. 197,100.

*To all whom it may concern:*

Be it known that I, WILLIAM A. WARNER, a citizen of the United States, residing at Spokane, in the county of Spokane and State of Washington, have invented certain new and useful Improvements in Nut-Locks, of which the following is a specification.

My invention relates to new and useful improvements in lock washers and is particularly adapted to lock a nut against rotation upon a bolt or the like.

An important object of my invention is to provide a device of the above mentioned character including means for engagement with the bolt upon which a nut is mounted and means for engaging the top of the nut for preventing the nut from rotating and becoming disengaged with the bolt.

Another object of my invention is to provide a device of the above mentioned character which is strong, durable, inexpensive to manufacture and efficient in practice.

Other objects and advantages will be apparent during the course of the following description.

In the accompanying drawings forming a part of the description and wherein like numerals are employed to designate like parts throughout the same, Figure 1 is an elevation of my invention applied to a nut and bolt.

Figure 1:
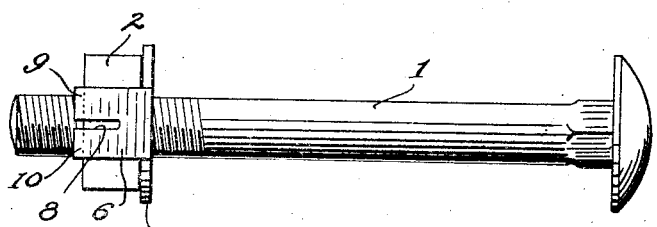
Figure 2:
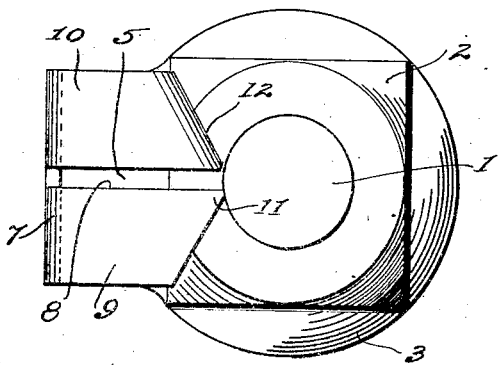
Fig. 2 is an enlarged top plan view of the same.
Figure 3:
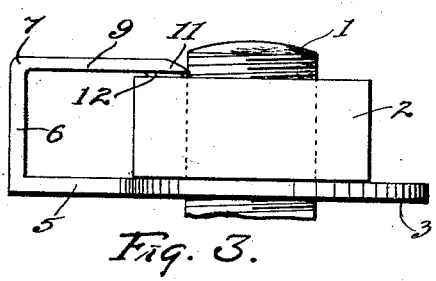
Fig. 3 is an enlarged side view of the washer applied to a nut and bolt.
Figure 4:
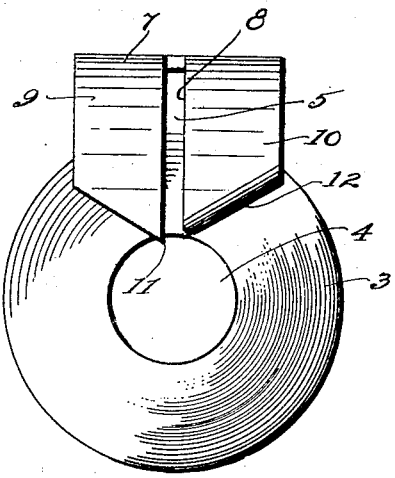
Fig. 4 is a top plan view of my invention.

In the drawing wherein for the purpose of illustration is shown a preferred embodiment of my invention, the numeral 1 indicates an ordinary bolt provided with threads to receive a nut 2. My washer consists of a circular washer 3 provided with a central aperture 4, and an extension 5, a portion of which lies in the same plane as the washer and extends outwardly a substantial distance. This extension is bent at right angles to the portions 5, to form the upright portion 6 which extends a substantial distance above the top of the nut. The free end 7 of the extension is then bent inwardly and at right angles to the upright 6 to overlap the top of the nut. The free end of the extension is bifurcated as at 8, said bifurcation extending from half way the portion 6 to the free end of the portion 7.

This bifurcation divides the free end 7 into two fingers 9 and 10, the finger 9 being cut diagonally from its outer edge to the upper inner corner to form the point 11, which is sharpened to extend into the threads of the bolt. It will be noted that the point 11 is positioned to one side of a radial line passing through a point intermediate between the two fingers, thereby affording a more secure grip in the threads as the threads do not merely pass over the point but are forced directly into the point when the nut begins to loosen. The finger 10 does not engage the threads of the bolt, but the end thereof is bent from its outer longitudinal edge diagonally downward to form a frictional member 12 which is adapted to bear against the top of the nut and prevent rotation of the same.

In use the bolt is inserted through the work, the nut is placed in the device between the washer 3 and the points 11 and 12 which are then pressed into position so that the aperture 4 coincides with the aperture in the nut. The washer and nut are then applied in the bolt and the nut and washer together rotated until the washer beds itself upon the work. Further rotation of the nut upon the washer will be necessary to send it home then.

When the nut begins to loosen the member 12 causes friction with the top of the nut while the point 11 embeds itself in the threads and prevents further backward rotation of the nut.

It is to be understood that the form of my invention herewith shown and described is to be taken as a preferred example of the same and that various changes in the shape, size and arrangement of parts may be resorted to without departing from the spirit of the invention or the scope of the subjoined claims.

Having described my invention, I claim:

1. The combination with a bolt, a nut thereon, of a washer provided with a bifurcated extension, one part of the bifurcated extension being provided with a pointed end to engage the threads of the bolt and the other having its end bent to frictionally engage said nut, said fingers being arranged so as to permit the nut to be screwed upon the bolt while said fingers are in said positions.

2. The combination with a bolt, of a nut thereon, of a washer provided with an extension, said extension being bent so that the free end thereof is arranged slightly above the top of said nut while the body part of said extension is spaced from the nut to permit rotation of the nut, the free end of said extension being bifurcated, one part of said bifurcated part being pointed to engage said bolt, and the other part of the bifurcated portion being bent downwardly to frictionally engage said nut to prevent back rotation of said nut.

3. The combination with a bolt, a nut thereon, of a washer provided with an extension, said extension being bent so that the free end thereof is arranged slightly above the top of said nut while the body part of said extension is spaced from the nut to permit rotation of the nut, the free end of said extension being bifurcated, one part of the bifurcated portion being cut away diagonally from its outer longitudinal edge to the inner corner thereof to form a point for engagement with said bolt, and the other bifurcated portion being cut away diagonally from its outer longitudinal edge to the inner corner thereof and bent diagonally downward in the same manner to frictionally engage the top of said nut.

4. The combination with a bolt, a nut thereon, of a washer provided with a bifurcated extension, one bifurcated portion having a point thereon to engage with said bolt, said point being to one side of a radial line drawn from the center of the bolt to a point intermediate between said bifurcated portion, and the other bifurcated portion having frictional engagement with said nut.

In testimony whereof I affix my signature in presence of two witnesses.

WILLIAM A. WARNER.

Witnesses:
 HAROLD W. REYNOLDS,
 J. E. WEST.

Copies of this patent may be obtained for five cents each, by addressing the "Commissioner of Patents, Washington, D. C."